US012124342B2

(12) United States Patent
Paulraj et al.

(10) Patent No.: US 12,124,342 B2
(45) Date of Patent: Oct. 22, 2024

(54) RECOVERY OF SMART NETWORK INTERFACE CONTROLLER OPERATING SYSTEM

(71) Applicant: Dell Products L.P., Round Rock, TX (US)

(72) Inventors: Deepaganesh Paulraj, Bangalore (IN); Akkiah Choudary Maddukuri, Austin, TX (US); Anusha Ghali, Belgaum (IN)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/732,759

(22) Filed: Apr. 29, 2022

(65) Prior Publication Data

US 2023/0350770 A1   Nov. 2, 2023

(51) Int. Cl.
  *G06F 11/14*  (2006.01)
  *G06F 8/61*  (2018.01)

(52) U.S. Cl.
  CPC .......... *G06F 11/1484* (2013.01); *G06F 8/63* (2013.01); *G06F 11/1438* (2013.01)

(58) Field of Classification Search
  CPC .. G06F 11/14; G06F 11/1484; G06F 11/1438; G06F 8/63
  See application file for complete search history.

(56) References Cited

U.S. PATENT DOCUMENTS

| | | | | |
|---|---|---|---|---|
| 5,774,640 | A * | 6/1998 | Kurio | G06F 11/2005 714/4.3 |
| 2006/0259291 | A1* | 11/2006 | Dunham | G06F 11/1482 703/25 |
| 2007/0168563 | A1* | 7/2007 | Jha | H04L 47/10 709/250 |
| 2007/0268820 | A1* | 11/2007 | McGee | H04B 3/46 370/390 |
| 2009/0103430 | A1* | 4/2009 | Wang | G06F 11/2005 370/221 |
| 2009/0319836 | A1* | 12/2009 | Khatri | G06F 11/2005 714/57 |
| 2011/0179312 | A1* | 7/2011 | Khatri | G06F 11/0745 714/43 |
| 2014/0208133 | A1* | 7/2014 | Gopal | G06F 11/2294 713/310 |
| 2019/0034281 | A1* | 1/2019 | Dubeyko | G06F 11/0724 |
| 2021/0026967 | A1* | 1/2021 | Suryanarayana | G06F 21/575 |
| 2021/0226846 | A1* | 7/2021 | Ballard | H04L 41/0843 |
| 2021/0314232 | A1* | 10/2021 | Nainar | H04L 45/02 |
| 2022/0197681 | A1* | 6/2022 | Rajagopal | H04L 67/51 |
| 2022/0231968 | A1* | 7/2022 | Rajagopal | H04L 47/827 |

(Continued)

*Primary Examiner* — Kamini B Patel
(74) *Attorney, Agent, or Firm* — Jackson Walker L.L.P.

(57) ABSTRACT

An information handling system may include a management controller configured to provide out-of-band management of the information handling system and a network interface controller including a network interface controller storage resource that has a network interface controller operating system (OS) stored thereon. The management controller may be configured to: determine that the network interface controller OS is not functioning correctly; retrieve an OS image for a replacement network interface controller OS; and cause the network interface controller to install the replacement network interface controller OS onto the network interface controller storage resource.

15 Claims, 3 Drawing Sheets

(56) References Cited

U.S. PATENT DOCUMENTS

| | | | |
|---|---|---|---|
| 2022/0263916 A1* | 8/2022 | Shah | G06F 13/4004 |
| 2023/0195488 A1* | 6/2023 | Ang | G06F 9/45558 |
| | | | 718/1 |
| 2023/0195675 A1* | 6/2023 | Ang | G06F 13/387 |
| | | | 710/313 |
| 2023/0198833 A1* | 6/2023 | Ang | H04L 41/0803 |
| | | | 709/220 |

* cited by examiner

RECOVERY OF SMART NETWORK INTERFACE CONTROLLER OPERATING SYSTEM

TECHNICAL FIELD

The present disclosure relates in general to information handling systems, and more particularly to methods and systems for recovering a corrupted operating system on a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs.

For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators and smart devices may benefit from the teachings of this disclosure. For the sake of clarity and concreteness, the SmartNIC example will be discussed in detail herein, but one of ordinary skill in the art with the benefit of this disclosure will understand its application to such other devices.

A SmartNIC may act as a system within a system, including its own Unified Extensible Firmware Interface Basic Input/Output System (UEFI BIOS) and its own operating system (OS) such as ESXio or any other suitable OS. This disclosure describes techniques for deploying a SmartNIC OS to a SmartNIC, and embodiments may be applied both in a manufacturer's factory environment and/or in a customer environment.

It may sometimes occur that one SmartNIC in an information handling system group or cluster may experience an OS crash or OS corruption. Embodiments of this disclosure provide techniques for recovering from such an event.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with recovering a SmartNIC OS may be reduced or eliminated.

In accordance with embodiments of the present disclosure, an information handling system may include a management controller configured to provide out-of-band management of the information handling system and a network interface controller including a network interface controller storage resource that has a network interface controller operating system (OS) stored thereon. The management controller may be configured to: determine that the network interface controller OS is not functioning correctly; retrieve an OS image for a replacement network interface controller OS; and cause the network interface controller to install the replacement network interface controller OS onto the network interface controller storage resource.

In accordance with these and other embodiments of the present disclosure, a method may include, in an information handling system including a management controller configured to provide out-of-band management of the information handling system and a network interface controller that includes a network interface controller storage resource having a network interface controller operating system (OS) stored thereon: the management controller determining that the network interface controller OS is not functioning correctly; the management controller retrieving an OS image for a replacement network interface controller OS; and the management controller causing the network interface controller to install the replacement network interface controller OS onto the network interface controller storage resource.

In accordance with these and other embodiments of the present disclosure, an article of manufacture may include a non-transitory, computer-readable medium having instructions thereon that are executable by at least one processor of a management controller of an information handling system for: determining that a network interface controller operating system (OS) stored on a network interface controller storage resource of a network interface controller is not functioning correctly; retrieving an OS image for a replacement network interface controller OS; and causing the network interface controller to install the replacement network interface controller OS onto the network interface controller storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
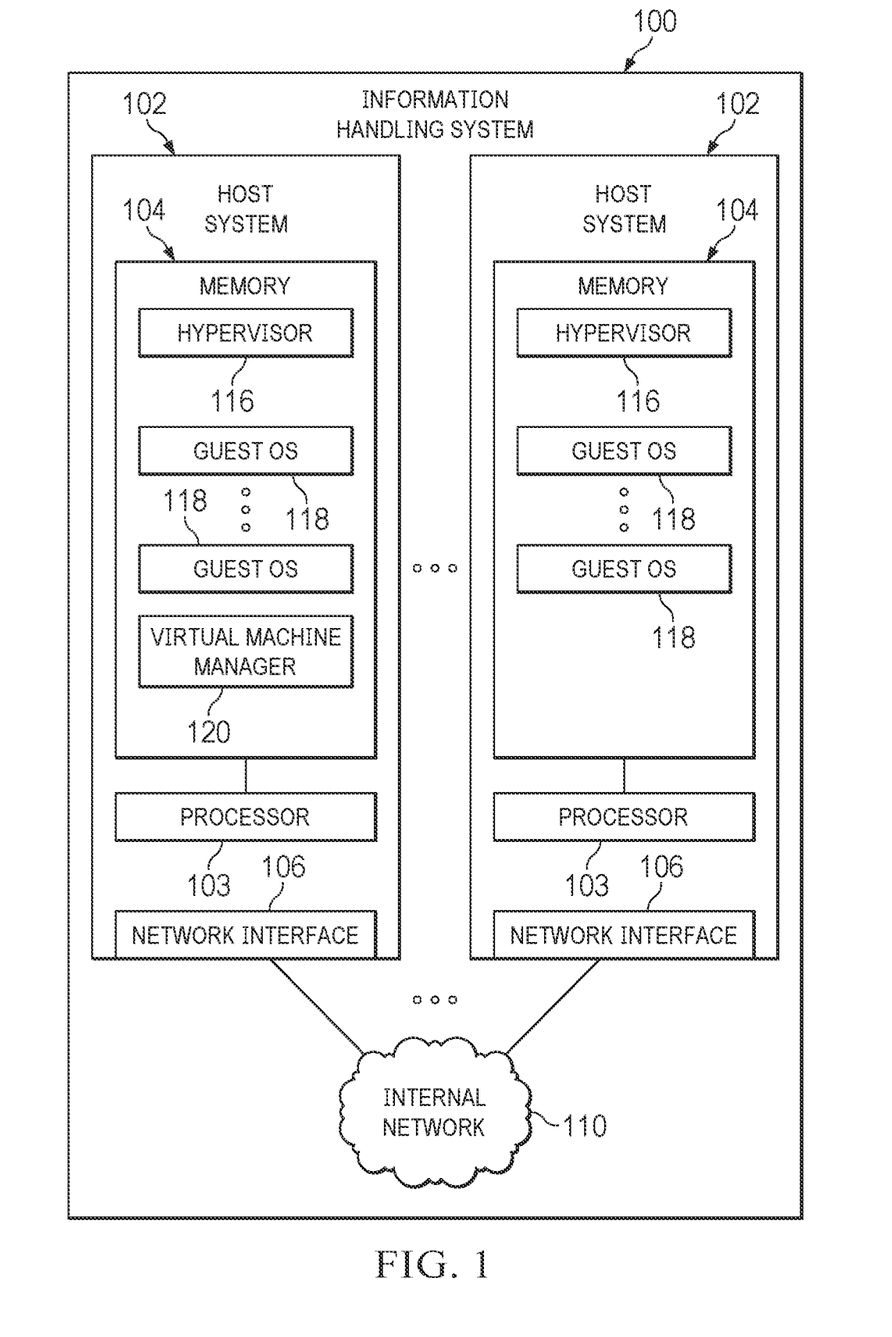
FIG. 1 illustrates a block diagram of selected components of an example information handling system, in accordance with embodiments of the present disclosure.
Figure 2:
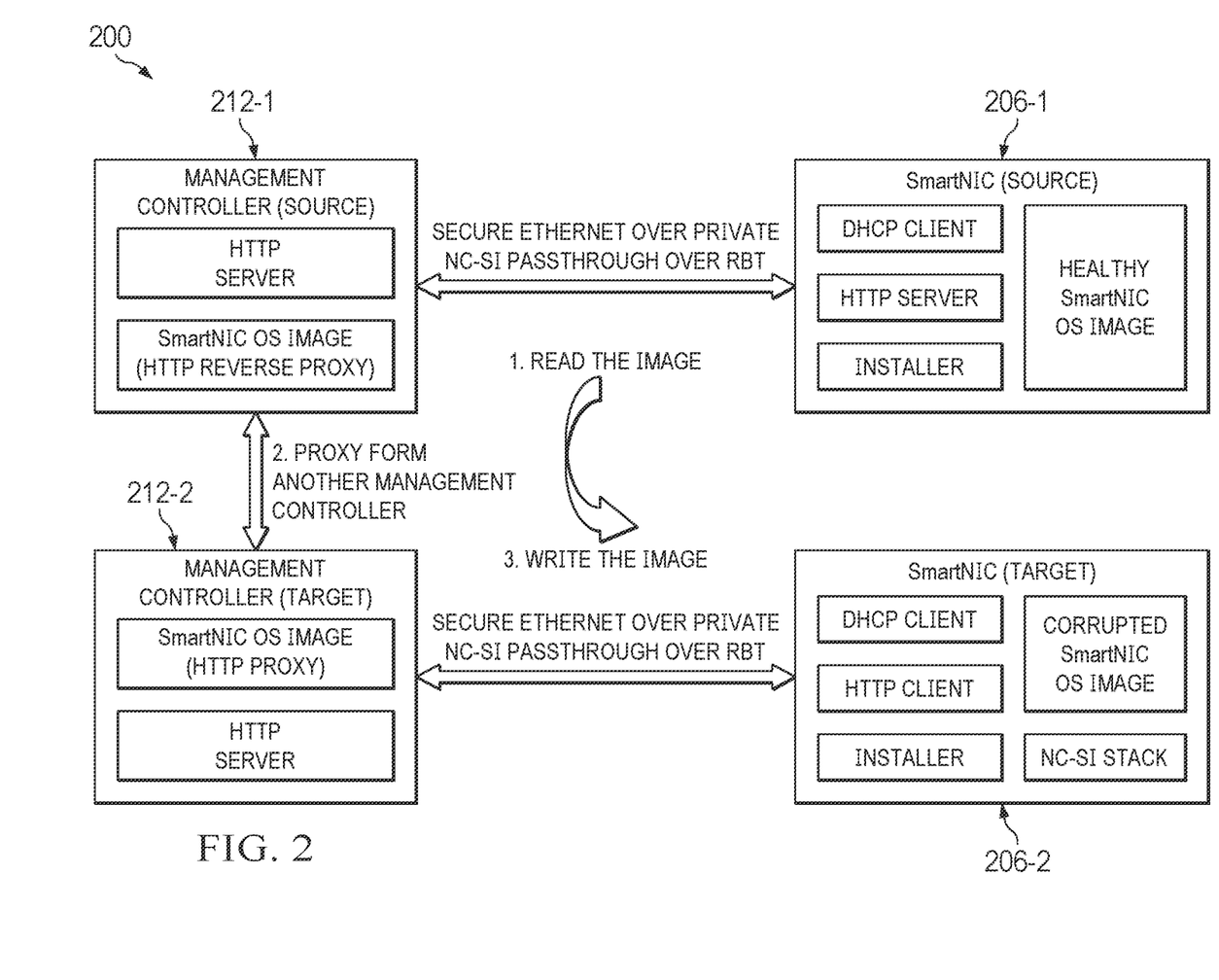
FIG. 2 illustrates a block diagram of selected components of an example information handling system, in accordance with embodiments of the present disclosure.
Figure 3:
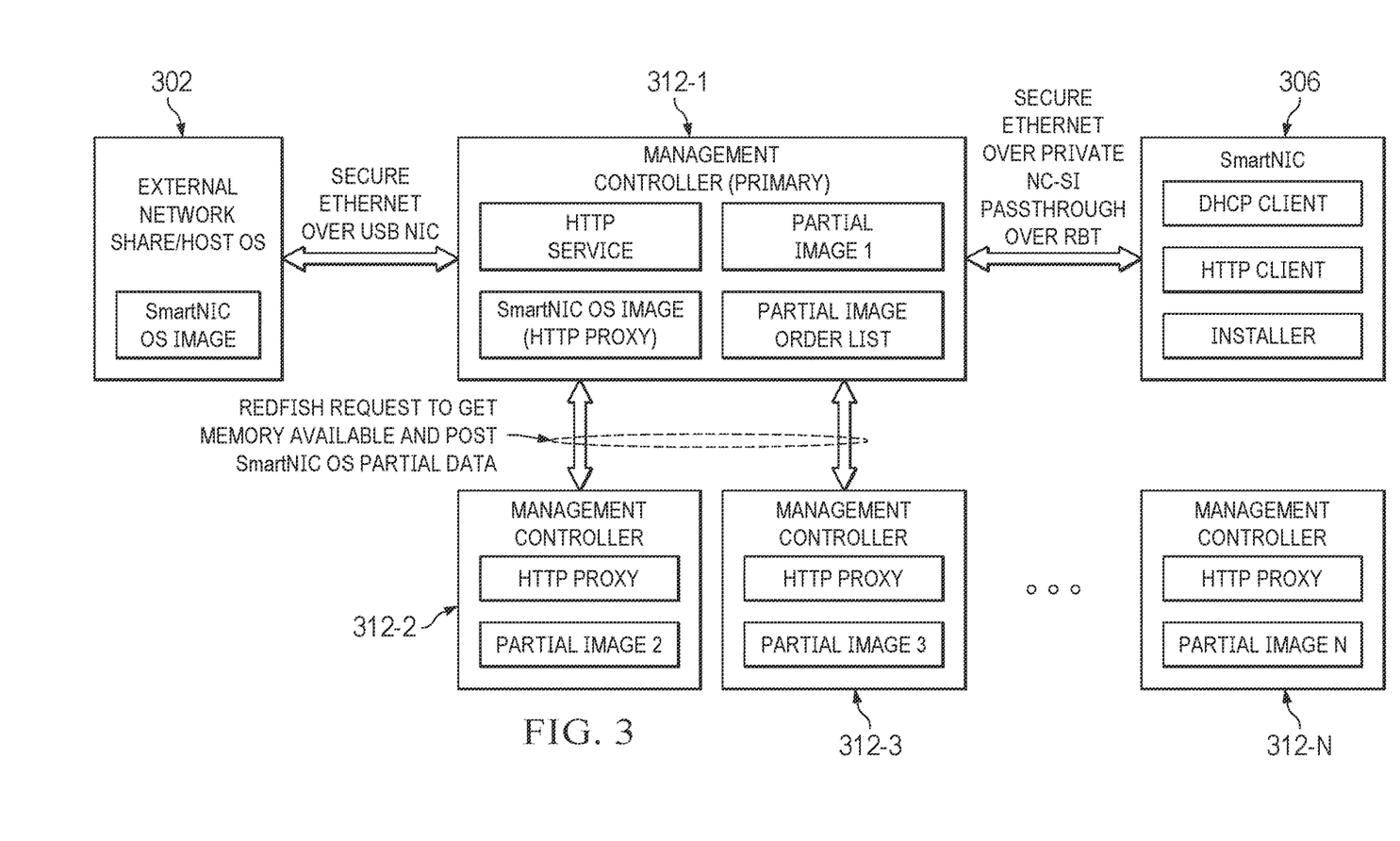
FIG. 3 illustrates a block diagram of selected components of an example information handling system, in accordance with embodiments of the present disclosure.

Preferred embodiments and their advantages are best understood by reference to FIGS. 1 through 3, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for recovering a failed or corrupted OS on network interfaces 106. Some embodiments may employ Redfish®, which is a communications standard designed to deliver simple and secure management functionality that is supported by many management controllers. Other embodiments may use different communications standards, but the example of Redfish® is discussed in detail herein for the sake of clarity and concreteness.

Turning now to FIG. 2, a block diagram of selected components of an information handling system 200 is shown, according to some embodiments. Information handling system 200 may include host systems (not shown), management controllers 212-1 and 212-2, and SmartNICs 206-1 and 206-2. The host systems may respectively be coupled to the hardware of SmartNICs 206 via a communication channel (not shown) such as Peripheral Component Interconnect Express (PCIe) in some embodiments.

Management controllers 212 may be coupled to the host systems via one or more communication channels, such as Ethernet over USB NIC, a system management bus (SMBus), etc. Management controllers 212 may be coupled to SmartNICs 206 via a network controller sideband interface (NC-SI), which may be established over reduced media-independent interface (RMII) based transport (RBT), over PCIe vendor-defined message (VDM), over SMBus, etc.

In one embodiment, a first information handling system may include a host system, management controller 212-1, and SmartNIC 206-1, while a second information handling system may include a host system, management controller 212-2, and SmartNIC 206-2.

As shown, SmartNIC 206-2 has experienced a problem and has a corrupted SmartNIC OS image. In some situations, the hardware and/or OS of the various SmartNICs that are present in information handling system 200 may be similar or identical, and so a replacement OS can be imaged directly onto SmartNIC 206-2 via a DD image of an uncorrupted SmartNIC OS from SmartNIC 206-1.

Management controller 212-2 may have the ability to pull the SmartNIC OS image DD file from the healthy SmartNIC 206-1 and push the update to the target corrupted SmartNIC 206-2 by proxying over the shared chassis network used by management controllers 212. In particular, a trusted authentication system may already be pre-established between the chassis network and management controllers 212. This may allow for a very fast recovery time without the need for any user intervention.

For example, a recovery process may proceed as follows. Management controller 212-2 may read the SmartNIC OS identification and/or version information from SmartNIC 206-2. Management controller 212-2 may also determine binding information that relates a particular SmartNIC OS type and version to a corresponding set of software executing on management controller 212-1 and/or the host system.

For example, binding information may relate a particular version of an ESXio SmartNIC OS to a particular version of ESXi. Management controllers 212 may track the host OS ESXi solution ID that is mapped to the SmartNIC ESXio version, allowing for selection of the right SmartNIC OS Image. This technique may also be used to identify and recover similar SmartNIC devices in the same network by storing partial SmartNIC OS images across various management controllers 212, as discussed in more detail below.

Based on the binding information, management controller 212-2 may determine that SmartNIC 206-1 is a good candidate to be used in the recovery, because it has the correct SmartNIC OS image.

Management controller 212-1 may then cause the healthy SmartNIC 206-1 to reboot into a pre-OS environment (e.g., a UEFI environment) so that the healthy SmartNIC OS image can be extracted in a raw disk image format such as DD format.

Management controller 212-2 may then mount the OS image, with management controller 212-1 configuring an HTTP/HTTPS reverse proxy for the path of the SmartNIC OS image. Management controller 212-2 may configure an HTTP/HTTPS proxy to the source management controller 212-1 and publish the SmartNIC OS boot target image path to the corrupted SmartNIC 206-2. In some embodiments, management controller 212-2 need not store the entire SmartNIC OS image, but may instead stream the data. Management controller 212-2 may then cause the corrupted SmartNIC 206-2 to reboot. SmartNIC 206-2 may download the SmartNIC OS image from within its UEFI environment and then install the SmartNIC OS.

Turning now to FIG. 3, a block diagram of selected components of another information handling system 300 is shown. Information handling system 300 has several similarities with information handling system 200, but for the sake of brevity and clarity, only the differences will be discussed in detail.

In this example, rather than coming entirely from a single location, a SmartNIC OS image may be retrieved in pieces from a plurality of locations. These locations may include various management controllers 312, as well as any suitable external network share and/or host OS 302. This may be advantageous in situations where the image is large compared to the available storage space on an individual management controller.

In one embodiment, when a SmartNIC OS is installed, a primary management controller 312-1 may identify the SmartNIC OS size, communicating and coordinating with other secondary management controllers 312-2 through 312-N (e.g., via one or more Redfish® requests) to check the availability of storage space across all management controllers. The primary management controller 312-1 may then calculate which portions of the SmartNIC OS image may be safely stored at each of the secondary management controllers. The primary management controller 312-1 may then transmit Redfish® POST requests to store the various portions of the SmartNIC OS image across the secondary management controllers.

In this way, each management controller may need only a small amount of storage space for the SmartNIC OS image. In some embodiments, multiple different types of OS images may be stored in this manner, with each management controller storing a portion of each image. Further, the designation of "primary" vs. "secondary" management controllers need not remain constant. For example, management controller 312-2 may act as a primary management controller for the SmartNIC it is coupled to, storing portions of the SmartNIC OS on the other management controllers in their role as secondary management controllers.

In the event of a SmartNIC OS crash at SmartNIC 306, primary management controller 312-1 may identify the crash (e.g., by detecting a lack of "heartbeat" messages) and proceed with SmartNIC OS recovery. Primary management controller 312-1 may then coordinate with the secondary management controllers 312-2 through 312-N, retrieving portions of the SmartNIC OS image and reassembling them into a usable image.

This technique may in some embodiments proceed without any user intervention and without the need to manually trigger a SmartNIC OS installation or recovery procedure.

In some embodiments, metadata regarding the locations, sizes, redundancy levels, and/or any other relevant information may be stored for each of the portions of the SmartNIC OS image. For example, primary management controller 312-1 may store a table (or other suitable data structure) indicating such information. An example table is shown below:

TABLE 1

| Management Controller | Offset Address Start | Offset Address End | Portion ID | Redundancy |
|---|---|---|---|---|
| 312-1 | 0x0000 | 0x1FFF | 1 | 1 |
| 312-1 | 0x2000 | 0x2FFF | 2 | 1 |
| 312-2 | 0x0000 | 0x1FFF | 1 | 1 |
| 312-2 | 0x3000 | 0x4FFF | 3 | 0 |
| 312-3 | 0x2000 | 0x2FFF | 2 | 1 |

As shown, portions need not be identical in size, and some or all portions may be stored in multiple places for the sake of redundancy.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a management controller configured to provide out-of-band management of the information handling system; and
a network interface controller including a network interface controller storage resource that has a network interface controller operating system (OS) stored thereon;
wherein the management controller is configured to:
determine that the network interface controller OS is not functioning correctly;
retrieve, from a different network interface controller, an OS image for a replacement network interface controller OS, wherein the OS image is retrieved from an onboard storage resource of the different network interface controller; and
cause the network interface controller to install the replacement network interface controller OS onto the network interface controller storage resource.

2. The information handling system of claim 1, wherein the network interface controller is a SmartNIC.

3. The information handling system of claim 1, wherein the replacement network interface controller OS is an uncorrupted version of the network interface controller OS.

4. The information handling system of claim 1, wherein the replacement network interface controller OS is a different version of the network interface controller OS.

5. The information handling system of claim 1, wherein the OS image is retrieved in portions from a plurality of other management controllers.

6. A method comprising, in an information handling system including a management controller configured to provide out-of-band management of the information handling system and a network interface controller that includes a network interface controller storage resource having a network interface controller operating system (OS) stored thereon:

the management controller determining that the network interface controller OS is not functioning correctly;

the management controller retrieving, from a different network interface controller, an OS image for a replacement network interface controller OS, wherein the OS image is retrieved from an onboard storage resource of the different network interface controller; and the management controller causing the network interface controller to install the replacement network interface controller OS onto the network interface controller storage resource.

7. The method of claim 6, wherein the network interface is a SmartNIC.

8. The method of claim 6, wherein the replacement network interface controller OS is an uncorrupted version of the network interface controller OS.

9. The method of claim 6, wherein the replacement network interface controller OS is a different version of the network interface controller OS.

10. The method of claim 6, wherein the OS image is retrieved in portions from a plurality of other management controllers.

11. An article of manufacture comprising a non-transitory, computer-readable medium having instructions thereon that are executable by at least one processor of a management controller of an information handling system for:

determining that a network interface controller operating system (OS) stored on a network interface controller storage resource of a network interface controller is not functioning correctly;

retrieving, from a different network interface controller, an OS image for a replacement network interface controller OS, wherein the OS image is retrieved from an onboard storage resource of the different network interface controller; and causing the network interface controller to install the replacement network interface controller OS onto the network interface controller storage resource.

12. The article of claim 11, wherein the network interface is a SmartNIC.

13. The article of claim 11, wherein the replacement network interface controller OS is an uncorrupted version of the network interface controller OS.

14. The article of claim 11, wherein the replacement network interface controller OS is a different version of the network interface controller OS.

15. The article of claim 11, wherein the OS image is retrieved in portions from a plurality of other management controllers.

* * * * *